US009920857B2

(12) United States Patent
Tanikawa et al.

(10) Patent No.: US 9,920,857 B2
(45) Date of Patent: Mar. 20, 2018

(54) VACUUM VALVE

(71) Applicant: FUJIKIN INCORPORATED, Osaka-shi (JP)

(72) Inventors: Tsuyoshi Tanikawa, Osaka (JP); Michio Yamaji, Osaka (JP); Tadayuki Yakushijin, Osaka (JP); Keisuke Ishibashi, Osaka (JP); Yasumasa Yanagida, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/898,824

(22) PCT Filed: Aug. 8, 2014

(86) PCT No.: PCT/JP2014/071000
§ 371 (c)(1),
(2) Date: Dec. 16, 2015

(87) PCT Pub. No.: WO2015/064170
PCT Pub. Date: May 7, 2015

(65) Prior Publication Data
US 2016/0230906 A1    Aug. 11, 2016

(30) Foreign Application Priority Data

Oct. 30, 2013    (JP) .................................. 2013-225175

(51) Int. Cl.
*F16K 15/00*    (2006.01)
*F16K 51/02*    (2006.01)
(Continued)

(52) U.S. Cl.
CPC ............ *F16K 51/02* (2013.01); *F16K 15/063* (2013.01); *F16K 15/186* (2013.01);
(Continued)

(58) Field of Classification Search
CPC ...... F16K 51/02; F16K 15/186; F16K 15/063; F16K 31/1221; F16K 31/1226;
(Continued)

(56) References Cited

U.S. PATENT DOCUMENTS 3,115,068 A * 12/1963 Lofink ................ F16K 31/1262
                                                137/505.18
4,444,216 A *  4/1984 Loup ................... F16K 11/0655
                                                137/115.15

(Continued)

FOREIGN PATENT DOCUMENTS

| CN | 202927169 U | 5/2013 |
| JP | 2002-195443 A | 7/2002 |

(Continued)

OTHER PUBLICATIONS

International Search Report dated Nov. 11, 2014, issued for PCT/JP2014/071000.

(Continued)

*Primary Examiner* — Craig J Price
*Assistant Examiner* — Andrew J Rost
(74) *Attorney, Agent, or Firm* — Locke Lord LLP

(57) ABSTRACT

A vacuum valve is provided with opening pressure setting means that sets a set value of a fluid pressure in a primary side passage beyond which communication is opened and forcible opening means that forcibly opens communication regardless of the fluid pressure in the primary side passage. The opening pressure setting means includes a spring receiver fixed to a stem, a compression coil spring having a lower end supported by the spring receiver, and an adjustment screw, movable in the axial direction, that presses the upper end of the compression coil spring. The forcible opening means includes a piston inserted onto the stem 5 under the spring receiver so as to be movable upward and (Continued)

downward and piston driving means that moves the piston and the spring receiver upward integrally by moving the piston upward using compressed air.

6 Claims, 6 Drawing Sheets

(51) Int. Cl.
  *F16K 31/122* (2006.01)
  *G05D 16/06* (2006.01)
  *G05D 16/18* (2006.01)
  *F16K 15/06* (2006.01)
  *F16K 15/18* (2006.01)

(52) U.S. Cl.
  CPC ...... *F16K 31/1221* (2013.01); *F16K 31/1226* (2013.01); *G05D 16/0619* (2013.01); *G05D 16/18* (2013.01); *Y10T 137/7877* (2015.04); *Y10T 137/7878* (2015.04)

(58) Field of Classification Search
  CPC .... F16K 15/18; G05D 16/18; G05D 16/0619; Y10T 137/7877; Y10T 137/7878
  USPC .............. 251/63.5, 62, 82, 83; 137/522, 523
  See application file for complete search history.

(56) References Cited

U.S. PATENT DOCUMENTS

| | | | | |
|---|---|---|---|---|
| 5,392,807 | A * | 2/1995 | Caudle | F16K 31/1221 137/316 |
| 5,419,361 | A * | 5/1995 | Caudle | F16K 31/1221 137/316 |
| 6,491,059 | B2 * | 12/2002 | Kajitani | F16K 31/1221 137/530 |
| 7,802,771 | B2 * | 9/2010 | Tsubota | F16K 7/14 251/331 |
| 2006/0065868 | A1 * | 3/2006 | Strong | F16K 31/1221 251/63.5 |
| 2009/0050832 | A1 | 2/2009 | Ejiri | |

FOREIGN PATENT DOCUMENTS

| | | |
|---|---|---|
| JP | 3330839 B2 | 9/2002 |
| JP | 2011-127655 A | 6/2011 |
| JP | 2012-233517 A | 11/2012 |
| KR | 10-2007-0108529 A | 11/2007 |

OTHER PUBLICATIONS

Official Letter dated Nov. 28, 2016, issued for the corresponding CN patent application.

\* cited by examiner

VACUUM VALVE

TECHNICAL FIELD

The present invention relates a vacuum valve and, more particularly, to a vacuum valve that has the primary side used under vacuum conditions and the secondary side used under atmospheric pressure conditions and is opened when the fluid pressure on the primary side exceeds a set value.

BACKGROUND ART

As a vacuum valve that has the primary side used under vacuum conditions and the secondary side used under atmospheric pressure conditions and is opened when the fluid pressure on the primary side exceeds a set value, PTL 1 discloses a vacuum valve including a body provided with a primary side passage and a secondary side passage, a cylindrical casing provided on the body, a valve element opening or closing communication between the primary side passage and the secondary side passage by moving upward or downward, a stem moving upward or downward integrally with the valve element, opening pressure setting means setting a set value of a fluid pressure in the primary side passage beyond which the communication is opened, and forcible opening means forcibly opening the communication regardless of the fluid pressure in the primary side passage, in which the forcible opening means is a manual handle.

In such a vacuum valve, the forcible opening means is desirably automatic (using compressed air). To achieve such a vacuum valve of automatic forcible opening type, combination with, for example, the vacuum valve of manual forcible opening type described in PTL 1 and the vacuum valve using compressed air described in PTL 2 is considered. The vacuum valve described in PTL 2 does not have opening pressure setting means that sets a set value of the fluid pressure in the primary side passage beyond which communication is opened.

CITATION LIST

Patent Literature

PTL 1: JP-A-2011-127655
PTL 2: Japanese Patent No. 330839

SUMMARY OF INVENTION

Technical Problem

In the vacuum valves in PTL 1 and PTL 2, the combined use of automatic forcible opening means (using compressed air) and the opening pressure setting means has not been achieved and, if an attempt is made to simply combine these, the structure of the vacuum valve becomes complicated and the size becomes large.

An object of the invention is to provide a vacuum valve that has forcible opening means operating automatically (using compressed air), opening pressure setting means, and a simple and compact structure.

Solution to Problem

A vacuum valve according to the invention includes a body provided with a primary side passage and a secondary side passage, a cylindrical casing provided on the body, a valve element opening or closing communication between the primary side passage and the secondary side passage by moving upward or downward, a stem moving upward or downward integrally with the valve element, opening pressure setting means setting a set value of a fluid pressure in the primary side passage beyond which the communication is opened, and forcible opening means forcibly opening the communication regardless of the fluid pressure in the primary side passage, the communication normally being closed and being opened when the fluid pressure in the primary side passage exceeds the set value, the communication being forcibly openable as needed, in which the opening pressure setting means includes a receiving member fixed to the stem, a stem biasing means having a lower end supported by the receiving member, and an adjustment screw movable in an axial direction, the adjustment screw pressing an upper end of the stem biasing means and the forcible opening means includes a piston inserted onto the stem under the receiving member so as to be movable upward and downward and piston driving means integrally moving the piston and the receiving member upward by moving the piston upward using compressed air.

In the vacuum valve according to the invention, when the stem and the valve element are biased downward by the elastic force of the stem biasing means, communication between the primary side passage and the secondary side passage is blocked (the vacuum valve is put in the close state) at a normal time. When the fluid pressure in the primary side passage exceeds a set value correlated with the elastic force of the stem biasing means, the fluid pressure in the primary side passage pushes the valve element upward, thereby opening communication (the vacuum valve is put in the normally open state). The set value can be adjusted to a predetermined value by changing the position of the adjustment screw. Normally, the primary side is used under vacuum conditions and the secondary side is used under atmospheric pressure conditions. When the fluid pressure on the primary side exceeds the set value, the primary pressure is released. In this way, the fluid pressure on the primary side is controlled so as to fall within the predetermined range.

When communication between the primary side passage and the secondary side passage needs to be opened forcibly regardless of the fluid pressure in the primary side passage, compressed air is introduced to operate the piston driving means of the forcible opening means, the piston inserted onto the stem so as to be movable upward and downward moves upward, and the piston and the receiving member integrally move upward. In this way, communication can be forcibly opened (the vacuum valve is forcibly opened) as needed regardless of the fluid pressure in the primary side passage.

As described above, the forcible opening means includes a piston inserted onto the stem under the receiving member so as to be movable upward and downward and piston driving means that brings the piston into contact with the receiving member by moving the piston upward using compressed air and integrally moves the piston and the receiving member upward. Since this structure is simple and compact, the vacuum valve has the simple and compact structure.

Preferably, the adjustment screw has a through hole extending in the axial direction, an upper end part of the stem is fitted into a lower end part of the through hole of the adjustment screw so as to be movable upward and downward, and the piston driving means includes a piston housing chamber provided in the casing, the piston housing chamber movably accommodating the piston, a compressed air introducing pipe connection portion provided in an upper end part of the through hole of the adjustment screw, a compressed air introduction axial direction passage extending downward from an upper end of the stem, and a compressed air introduction axial direction passage extending radially outward from the compressed air introduction axial direction passage and communicating with a lower part of the piston housing chamber.

In this structure, since a part of the structure of the forcible opening means is provided in the adjustment screw and the stem, the structure of the vacuum valve becomes simpler and more compact.

The piston driving means may include a piston housing chamber provided in the casing, the piston housing chamber movably accommodating the piston, and a compressed air introducing pipe connection portion provided on a circumferential wall of the casing, the compressed air introducing pipe connection portion communicating with the lower part of the piston housing chamber via an annular recess provided in a lower end of the piston housing chamber.

Preferably, the forcible opening means further includes piston biasing means biasing the piston downward.

In this structure, since the piston reliably returns to the original position after forcible opening is performed by the forcible opening means, an appropriate state during a normal time can be obtained.

Advantageous Effects of Invention

Since the vacuum valve according to the invention can be forcibly opened automatically by the piston inserted onto the stem under the receiving member so as to be movable upward and downward and piston driving means integrally moving the piston and the receiving member upward, the vacuum valve has the simple and compact structure.

Figure 1:
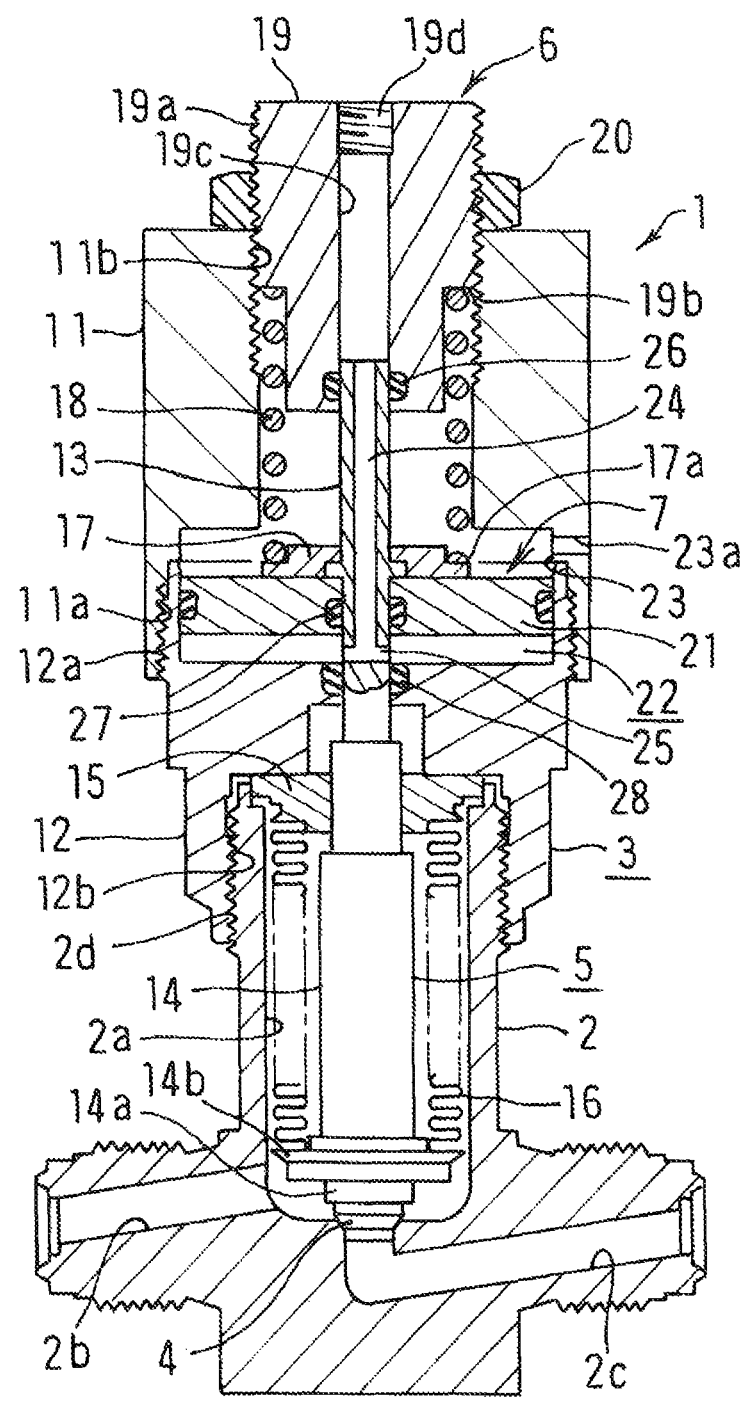
FIG. 1 is a vertical cross sectional view illustrating a vacuum valve according to a first embodiment of the present invention in which fluid passages is in the close state.

REFERENCE SIGNS LIST (1): vacuum valve
(2): body
(2b): primary side passage
(2c): secondary side passage
(3): casing
(4): disk packing (valve element)
(5): stem
(6): opening pressure setting means
(7): forcible opening means
(17): spring receiver (receiving member)
(18): compression coil spring (stem biasing means)
(19): adjustment screw
(19c): through hole
(19d): compressed air introducing pipe connection portion
(21); piston
(22): piston driving means
(23): piston housing chamber
(24): compressed air introduction axial direction passage
(25): compressed air introduction axial direction passage
(31): vacuum valve
(32): body
(32b): primary side passage
(32c): secondary side passage
(33): casing
(34): disk packing (valve element)
(35): stem
(36): opening pressure setting means
(37): forcible opening means
(47): lower spring receiver (receiving member)
(48): compression coil spring (stem biasing means)
(50): adjustment screw
(52); piston
(53): piston driving means
(54): compression coil spring (piston biasing means)
(55): piston housing chamber
(56): compressed air introducing pipe connection portion

DESCRIPTION OF EMBODIMENTS

Embodiments of the present invention will be described below with reference to the drawings.

Figure 2:
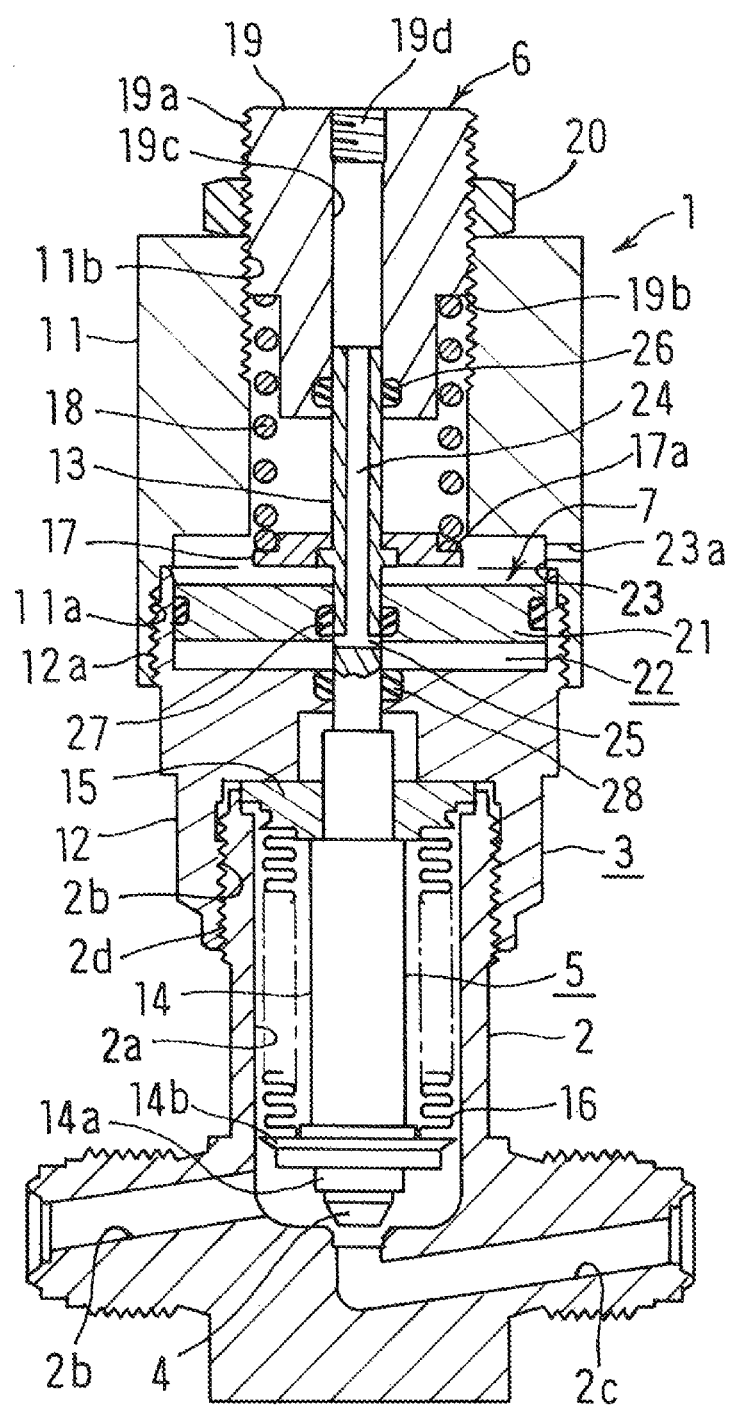
FIG. 2 is a vertical cross sectional view illustrating the vacuum valve according to the first embodiment of the invention in which the fluid passages are in the normally open state.
Figure 3:
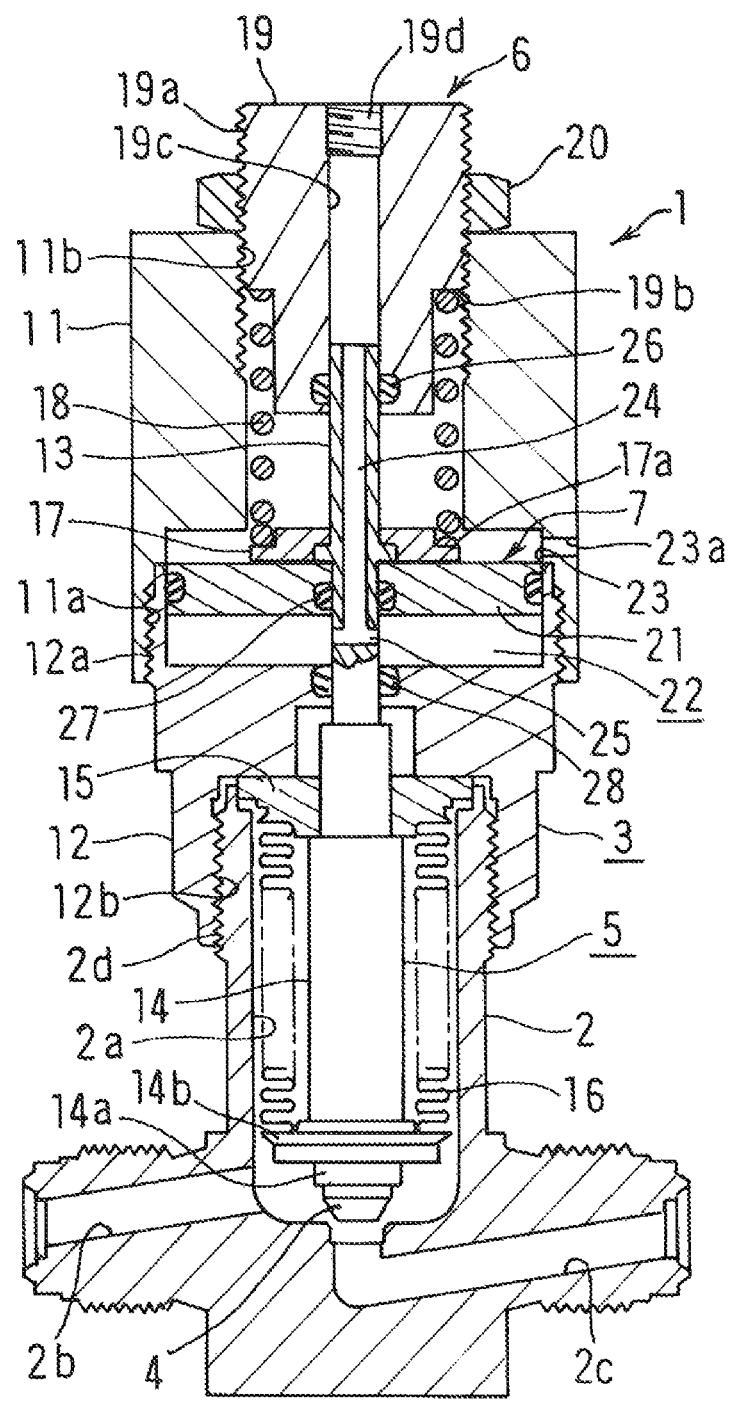
FIG. 3 is a vertical cross sectional view illustrating the vacuum valve according to the first embodiment of the invention in which the fluid passages are in the forcibly open state.

FIGS. 1 to 3 illustrate a vacuum valve according to a first embodiment of the invention. In a vacuum valve (1), communication is closed as illustrated in FIG. 1 at a normal time and, when the fluid pressure in a primary side passage (2b) exceeds a set value, communication is opened as illustrated in FIG. 2 and communication is forcibly opened as needed as illustrated FIG. 3.

The vacuum valve (1) includes a concave portion (2a) opened upward, a body (2) provided with the primary side passage (2b) and a secondary side passage (2c), a cylindrical casing (3) provided on the body (2), a disk packing (valve element) (4), provided at the opening of the secondary side passage (2c) of the body (3), that opens or closes communication between the primary side passage (2b) and the secondary side passage (2c) by moving upward or downward, a stem (5), having a lower end part to which a disk packing (4) is fixed, that moves upward or downward integrally with the disk packing (4), opening pressure setting means (6) setting a set value of a fluid pressure in the primary side passage (2b) beyond which the communication is opened, and forcible opening means (7) forcibly opening the communication regardless of the fluid pressure in the primary side passage (2b).

The primary side passage (2b) communicates with the lower part opening in the side surface of the concave portion (2a) and the secondary side passage (2c) communicates with the central opening of the bottom of the concave portion (2a).

The disk packing (4) is disposed so as to be able to close the central opening (that is, the opening at the upper end of the secondary side passage (2c)) at the bottom of the concave portion (2a).

The casing (3) includes a cylindrical upper casing (11) and a cylindrical lower casing (12). A female thread section (11a) provided in the inner periphery of the lower end part of the upper casing (11) is screwed with a male thread section (12a) provided in the outer periphery of the upper end part of the lower casing (12). A female thread section (12b) provided in the inner periphery of the lower end part of the lower casing (12) is screwed with a male thread section (2d) provided in the upper end part of the body (2). A female thread section (11b) is provided in the inner periphery of the upper end part of the upper casing (11).

The stem (5) includes an upper stem (13) and a lower stem (14). In the lower end part of the lower stem (14), a cylindrical lower projection (14a) into which the disk packing (4) is fitted is provided. A bellows fixing ring (15) is fixed to the upper end part of the upper stem (13) and a bellows (16) is disposed between the fixing ring (15) and a flange section (14b) provided in the lower end part of the lower stem (14).

The opening pressure setting means (6) includes an annular spring receiver (receiving member) (17) fixed substantially in the middle in the axial direction of the upper stem (13), a compression coil spring (stem biasing means) (18) having a lower end supported by the spring receiver (17), and an adjustment screw (19) that has a male thread section (19a) on its outer periphery surface, is screwed with the female thread section (11b) provided in the inner periphery of the upper end part of the upper casing (11), presses the upper end of a compression coil spring (18), and can move in the axial direction, and a lock nut (20) that is screwed with the male thread section (19a) of the adjustment screw (19) and fixes the adjustment screw (19) to the upper casing (11).

An annular step section (19b) is provided in the middle in the axial direction of the outer periphery surface of the adjustment screw (19). The upper end of the compression coil spring (18) is received by the step section (19b) of the adjustment screw (19) and the lower end of the compression coil spring (18) is received by a step section (17a) provided in the spring receiver (17).

Since the elastic force of the compression coil spring (18) can be changed by screwing the adjustment screw (19) downward or upward, the biasing force (elastic force) biasing the stem (5) downward can be adjusted.

The adjustment screw (19) has a through hole (19c) extending in the axial direction and the upper end part of the upper stem (13) is fitted into the lower end part of the through hole (19c) of the adjustment screw (19) so as to be movable upward and downward. An O-ring (26) is disposed between the outer periphery of the upper end part of the upper stem (13) and the inner periphery of the lower end part of the through hole (19c) of the adjustment screw (19).

The forcible opening means (7) has a discoid piston (21) that is inserted onto the upper stem (13) so as to be movable upward and downward under the spring receiver (17) and piston driving means (22) that brings the piston (21) into contact with the spring receiver (17) from below by moving the piston (21) upward using compressed air and integrally moves the piston (21) and the spring receiver (17) upward.

An O-ring (27) is disposed between the upper stem (13) and the inner periphery of the central through hole of the piston (21) through which the upper stem (13) passes. An O-ring (28) is also disposed between the upper stem (13) and the inner periphery of the central through hole of the lower casing (12) that guides the upper stem (13).

The piston driving means (22) includes a piston housing chamber (23), disposed from the inside of the lower end part of the upper casing (11) to the inside of the upper end part of the lower casing (12), that movably accommodates the piston (21), the through hole (19c), which is a compressed air passage in the adjustment screw (19), a compressed air introducing pipe connection portion (19d) provided in the upper end part of the through hole (19c) of the adjustment screw (19), a compressed air introduction axial direction passage (24) extending downward from the upper end of the upper stem (13), and a compressed air introduction axial direction passage (25) extending radially outward from the compressed air introduction axial direction passage (24) and communicating with the lower part of the piston housing chamber (23).

A pipe is connected to the compressed air introducing pipe connection portion (19d) so that a control apparatus introduces compressed air through the pipe as needed.

An O-ring (29) is disposed between the outer periphery surface of the piston (21) and the inner periphery of the piston housing chamber (23). An air escape hole (23a) leading to the outside is provided in the upper part of the piston housing chamber (23).

In the vacuum valve (1), generally, the primary side is used under vacuum conditions and the secondary side is used under atmospheric pressure conditions. In the state illustrated in FIG. 1, the close state of the vacuum valve (1) is kept by the pressure applied to the bellows (16) and the elastic force of the compression coil spring (18) and the primary side pressure is not released.

When the primary side fluid pressure increases, the elastic force of the compression coil spring (18) cannot stand against the fluid pressure and, in such a state, the stem (5) and the disk packing (4) fixed to the stem (5) move upward. Accordingly, the open state of the vacuum valve (1) illustrated in FIG. 2 is obtained and the primary side pressure is released. By changing the amount of screwing of the adjustment screw (19) to adjust the elastic force of the compression coil spring (18), the set value of the fluid pressure beyond which the primary side pressure is released can be set freely and the primary side pressure is suppressed to the set value or less.

When the primary side pressure is released in the state in FIG. 2 and the primary side pressure becomes smaller than the set value, a return to the state in FIG. 1 is made. When the primary side pressure needs to be released due to occurrence of a trouble or the like in this state in FIG. 1, compressed air is introduced to the forcible opening means (7). FIG. 3 illustrates the open state of the vacuum valve (1) provided by the forcible opening means (7).

In FIG. 3, the piston (21) having a gap between the piston (21) and the spring receiver (17) in FIG. 2 moves upward due to compressed air introduced to the lower part of the piston housing chamber (23), makes contact with the spring receiver (17), and pushes the spring receiver (17) upward. Since the spring receiver (17) is fixed to the stem (5), the stem (5) and the disk packing (4) fixed to the stem (5) move upward as the spring receiver (17) moves upward. In this way, the open state of the vacuum valve (1) illustrated in FIG. 3 can be obtained regardless of the fluid pressure in the primary side passage.

In the above description, the passages (19c), (19d), (24), and (25) of compressed air in the piston driving means (22) are not limited to those illustrated in the drawing and may be changed as appropriate.

Figure 4:
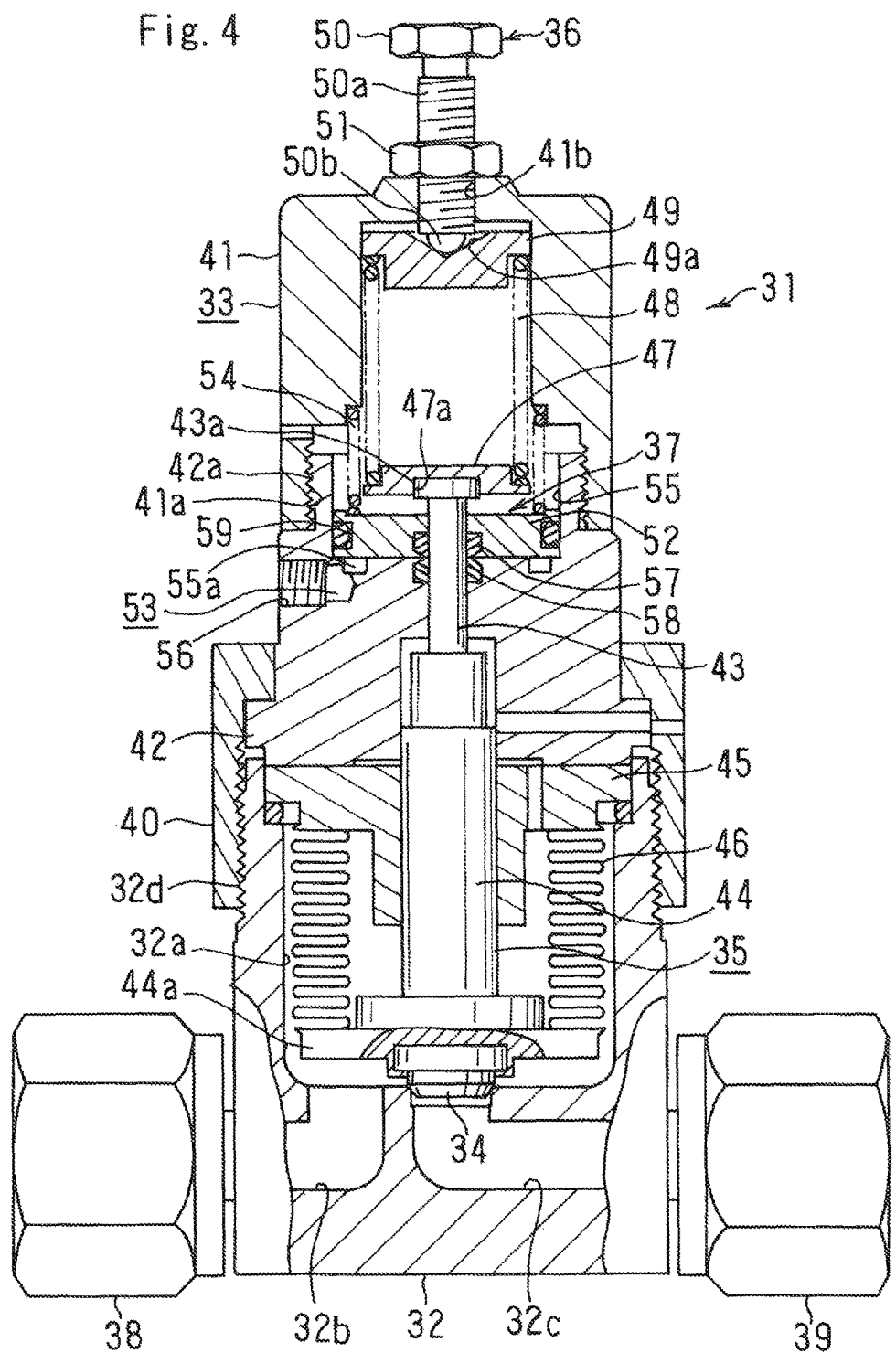
FIG. 4 is a vertical cross sectional view illustrating a vacuum valve according to a second embodiment of the invention in which the fluid passages are in the close state.
Figure 5:
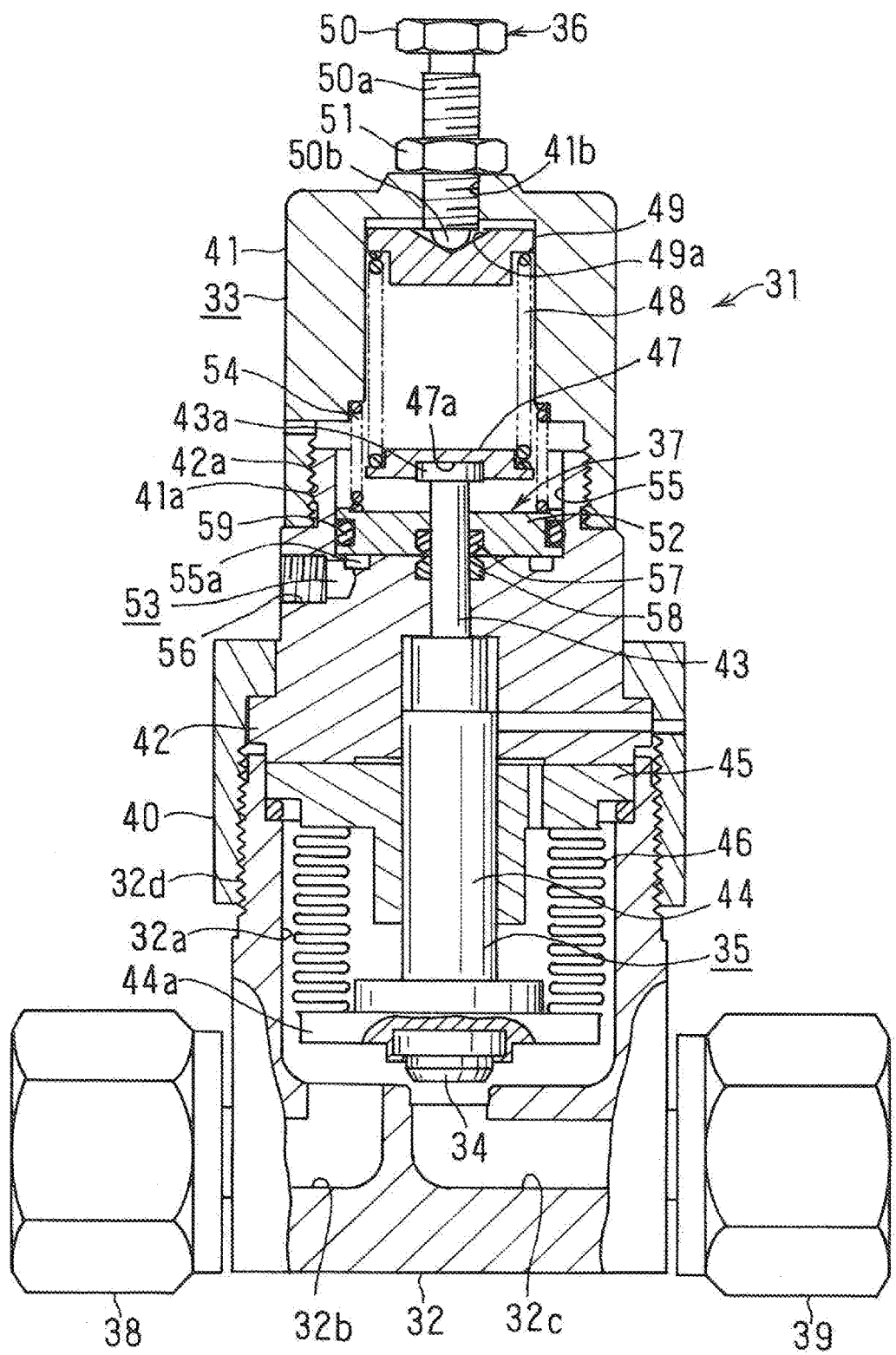
FIG. 5 is a vertical cross sectional view illustrating the vacuum valve according to the second embodiment of the invention in which the fluid passages are in the normally open state.
Figure 6:
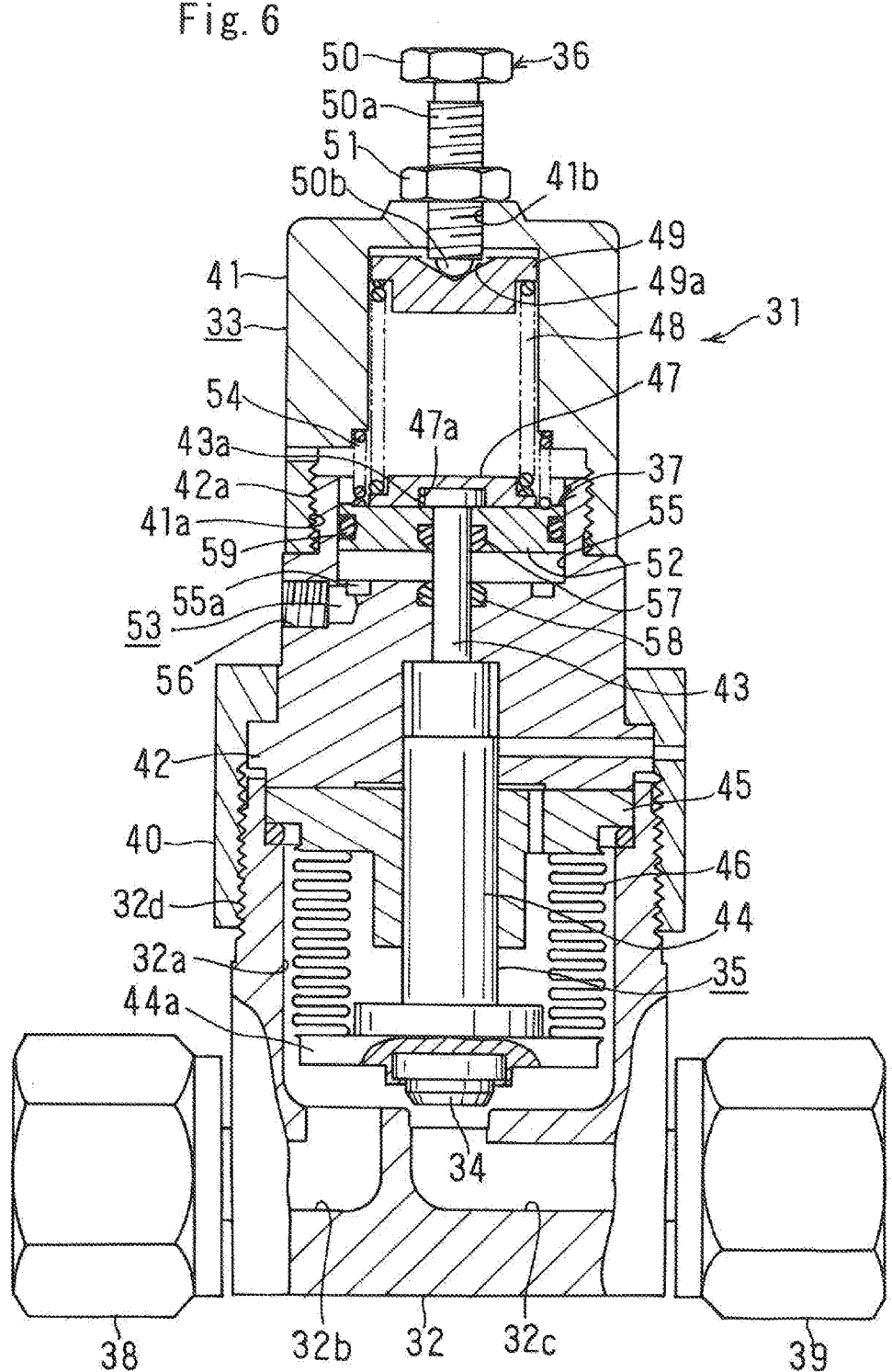
FIG. 6 is a vertical cross sectional view illustrating the vacuum valve according to the second embodiment of the invention in which the fluid passages are in the forcibly open state.

FIGS. 4 to 6 illustrate a vacuum valve (31) according to a second embodiment of the invention.

The vacuum valve (31) includes a concave portion (32a) opened upward, a body (32) provided with a primary side passage (32b) and a secondary side passage (32c), a cylindrical casing (33) provided on the body (32), a disk packing (valve element) (34), provided at the opening of the secondary side passage (32c) of the body (33), that opens or closes communication between the primary side passage (32b) and the secondary side passage (32c) by moving upward or downward, a stem (35), having a lower end part to which the disk packing (34) is fixed, that moves upward or downward integrally with the disk packing (34), opening pressure setting means (36) setting a set value of a fluid pressure in the primary side passage (32b) beyond which the communication is opened, and forcible opening means (37) forcibly opening the communication regardless of the fluid pressure in the primary side passage (32b).

The primary side passage (32b) communicates with the opening of the outer periphery edge of the bottom of the concave portion (32a) and the secondary side passage (32c) communicates with the central opening of the bottom of the concave portion (32a). The primary side passage (32b) and the secondary side passage (32c) are provided with pipe joints (38) and (39), respectively.

The disk packing (34) is disposed so as to be able to close the central opening (that is, the opening at the upper end of the secondary side passage (32c)) at the bottom of the concave portion (32a).

The casing (33) includes a cylindrical upper casing (41) and a cylindrical lower casing (42). A female thread section (41a) provided in the inner periphery of the lower end part of the upper casing (41) is screwed with a male thread section (42a) provided in the outer periphery of the upper end part of the lower casing (42). The lower casing (42) is fixed to the body (32) by screwing a nut (40) fitted onto the step of the lower casing (42) with a male thread section (32d) provided in the upper end part of the body (32).

The stem (35) includes an upper stem (43) and a lower stem (44). The disk packing (34) is fitted into a bellows fixing flange (44a) provided in the lower end part of the lower stem (44) and fixed. A bellows fixing ring (45) is fixed in the vicinity of the upper end part of the lower stem (43) and a bellows (46) is disposed between the fixing ring (45) and the bellows fixing flange (44a) at the lower end of the lower stem (44).

The opening pressure setting means (36) includes the annular lower spring receiver (receiving member) (47) fixed to the upper end of the upper stem (43), the compression coil spring (stem biasing means) (48) having a lower end supported by the lower spring receiver (47), the upper spring receiver (49), supporting the upper end of the compression coil spring (48), that is movable in the axial direction, the adjustment screw (50) that has a male thread section (50a) on the outer periphery surface, is screwed with the female thread section (41b) provided in the inner periphery of the upper end part of the upper casing (41), presses the upper end of the upper spring receiver (49), and can move in the axial direction, and a lock nut (51) that is screwed with the male thread section (50a) of the adjustment screw (50) and fixes the adjustment screw (50) to the upper casing (41).

The adjustment screw (50) is a ball plunger having a rotatable ball (50b) at its lower end and the lower part of the ball (50b) is fitted into a conical concave portion (49a) provided in the upper surface of the upper spring receiver (49).

The upper stem (43) has a flange section (43a) on its upper end and the lower spring receiver (47) has a concave portion (47a) on its lower surface. Since the flange section (43a) is fitted into the concave portion (47a), the upper stem (43) and the lower spring receiver (47) integrally move upward and downward.

Since the elastic force of the compression coil spring (48) can be changed by screwing the adjustment screw (50) downward or upward to move the upper spring receiver (49) downward or upward, the biasing force (elastic force) biasing the stem (35) downward can be adjusted.

The forcible opening means (37) has a discoid piston (52) that is inserted onto the upper end pert of the upper stem (43) so as to be movable upward and downward under the flange section (43a), piston driving means (53) that integrally moves the piston (52) and the spring receiver (47) upward by moving the piston (52) upward using compressed air, and a compression coil spring (piston biasing means) (54) biasing the piston (52) downward.

An O-ring (57) is disposed between the upper stem (43) and the inner periphery of the central through hole of the piston (52) through which the upper stem (43) passes. An O-ring (58) is also disposed between the upper stem (43) and the inner periphery of the central through hole of the lower casing (42) that guides the upper stem (43).

The piston driving means (53) includes a piston housing chamber (55), provided in the upper end part of the lower casing (42), that movably accommodates the piston (52) and a compressed air introducing pipe connection portion (56), provided in the circumferential wall of the lower casing (42), that communicates with the lower part of the piston housing chamber (55) via the annular concave portion (55a) provided at the lower end of the piston housing chamber (55).

A pipe is connected to the compressed air introducing pipe connection portion (56) so that a control apparatus introduces compressed air through the pipe as needed.

An O-ring (59) is disposed between the outer periphery surface of the piston (52) and the inner periphery of the piston housing chamber (55).

In the vacuum valve (31), generally, the primary side is used under vacuum conditions and the secondary side is used under atmospheric pressure conditions. In the state illustrated in FIG. 4, the close state of the vacuum valve (31) is kept by the pressure applied to the bellows (46) and the elastic force of the compression coil spring (48) and the primary side pressure is not released.

When the primary side fluid pressure increases, the elastic force of the compression coil spring (48) cannot stand against the fluid pressure and, in such a state, the stem (35) and the disk packing (34) fixed to the stem (35) move upward. Accordingly, the open state of the vacuum valve (31) illustrated in FIG. 5 is obtained and the primary side pressure is released. By changing the amount of screwing of the adjustment screw (50) to adjust the elastic force of the compression coil spring (48), the set value of the fluid pressure beyond which the primary side pressure is released can be set freely and the primary side pressure is suppressed to the set value or less.

When the vacuum valve (31) is put in the open state, the primary side pressure is released, and the primary side pressure becomes smaller than the set value, a return to the state in FIG. 4 is made.

When the primary side pressure needs to be released due to occurrence of a trouble or the like in this state in FIG. 4, compressed air is introduced to the forcible opening means (37). The compressed air is supplied to the lower end of the piston housing chamber (55) through the compressed air introducing pipe connection portion (56) and the annular concave portion (55a) and the piston (52) thereby moves upward. The stem (35) is in the stop state at the time when the piston (52) starts moving. However, after the upper surface of the piston (52) makes contact with the lower surface of the flange section (43a) of the upper stem (43), the stem (35) and the piston (52) integrally move upward.

Accordingly, the vacuum valve (31) is put in the open state by the forcible opening means (37) as illustrated in FIG. 6. In the open state obtained by the forcible opening means (37), the piston (52) moves upward by the compressed air introduced to the lower part of the piston housing chamber (55) and the spring receiver (47) is pushed upward accordingly. Since the spring receiver (47) is fixed to the stem (35) (the upper end part of the upper stem (43)), as the spring receiver (47) moves upward, the stem (35) and the disk packing (34) fixed to the stem (35) move upward. In this way, the open state of the vacuum valve (31) can be obtained forcibly regardless of the value of the fluid pressure of the primary side.

When the supplying of compressed air is stopped after the open state of the vacuum valve (31) is obtained by the forcible opening means (37), the piston (52) is moved downward by the compression coil spring (54) and returns to the position illustrated in FIG. 4. With this, an appropriate state at normal time is obtained.

The compression coil spring (54) for biasing the piston (52) downward may be added to bias the piston (21) downward in the first embodiment.

In the above embodiments, since the structures of the opening pressure setting means (6) and (36) and the forcible opening means (7) and (37) are simple and compact, the structures of the vacuum valves (1) and (31) are simple and compact.

In the first embodiment, the adjustment screw (19) and the stem (5) are provided with some (the through hole (19c), the compressed air introducing pipe connection portion (19d), the compressed air introduction axial direction passage (24), and the compressed air introduction axial direction passage (25)) of the components of the forcible opening means (7), so the structure of the vacuum valve (1) becomes simpler and more compact.

INDUSTRIAL APPLICABILITY

According to the invention, the vacuum valve has the forcible opening means operating automatically (using compressed air), the opening pressure setting means, and a simple and compact structure, so the invention contributes to automatic operation of various types of fluid control apparatuses including the vacuum valve.

The invention claimed is:

1. A vacuum valve comprising:
a body provided with a primary side passage and a secondary side passage;
a cylindrical casing provided on the body;
a valve element opening or closing communication between the primary side passage and the secondary side passage by moving upward or downward;
a stem moving upward or downward integrally with the valve element;
opening pressure setting means setting a set value of a fluid pressure in the primary side passage beyond which the communication is opened; and
forcible opening means forcibly opening the communication regardless of the fluid pressure in the primary side passage, the communication normally being closed and being opened when the fluid pressure in the primary side passage exceeds the set value, the communication being forcibly openable as needed,
wherein the opening pressure setting means includes a receiving member fixed to the stem, a stem biasing member having a lower end supported by the receiving member, and an adjustment screw movable in an axial direction, the adjustment screw pressing an upper end of the stem biasing member and
the forcible opening means includes a piston inserted onto the stem under the receiving member so as to be movable upward and downward wherein in a normally open state the piston has a gap between the piston and the receiving member, and in a forcibly open state the piston moves upward due to compressed air and makes contact with the receiving member and pushes the receiving member upward.

2. The vacuum valve according to claim 1, wherein the adjustment screw has a through hole extending in the axial direction, an upper end part of the stem is fitted into a lower end part of the through hole of the adjustment screw so as to be movable upward and downward, and further comprising:
a piston housing chamber provided in the casing, the piston housing chamber movably accommodating the piston, a compressed air introducing pipe connection portion provided in an upper end part of the through hole of the adjustment screw, a compressed air introduction axial direction passage extending downward from an upper end of the stem, and a compressed air introduction axial direction passage extending radially outward from the compressed air introduction axial direction passage and communicating with a lower part of the piston housing chamber.

3. The vacuum valve according to claim 2, wherein the forcible opening means further includes a piston biasing member biasing the piston downward.

4. The vacuum valve according to claim 1, further comprising:
a piston housing chamber provided in the casing, the piston housing chamber movably accommodating the piston, and a compressed air introducing pipe connection portion provided on a circumferential wall of the casing, the compressed air introducing pipe connection portion communicating with the lower part of the piston housing chamber via an annular recess provided in a lower end of the piston housing chamber.

5. The vacuum valve according to claim 4, wherein the forcible opening means further includes a piston biasing member biasing the piston downward.

6. The vacuum valve according to claim 1, wherein the forcible opening means further includes a piston biasing member biasing the piston downward.

* * * * *